Jan. 14, 1936. M. S. CURTIS 2,027,901
SUPPLEMENTARY TOOL SUPPORT FOR TURRET LATHES
Filed June 29, 1932
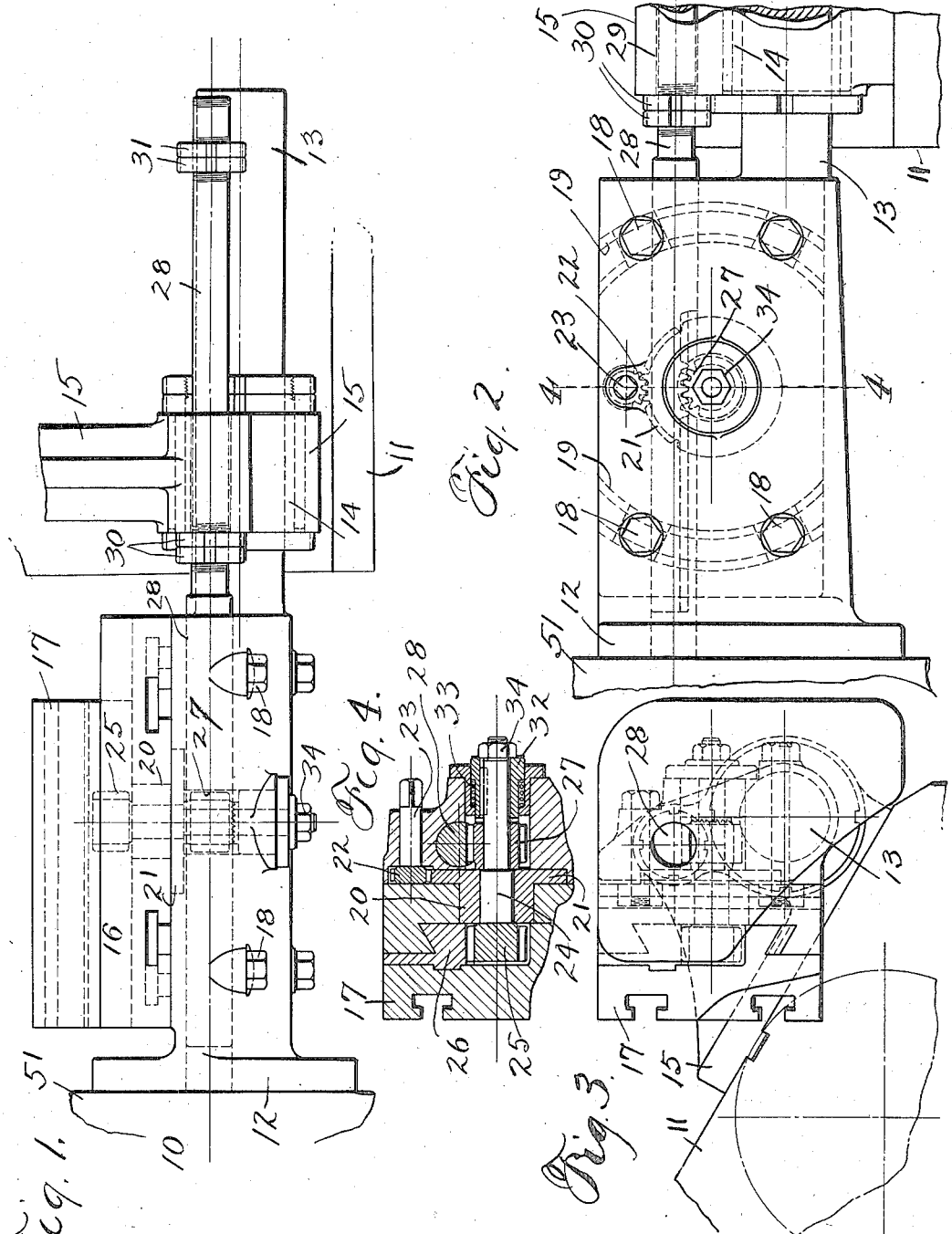

Patented Jan. 14, 1936

2,027,901

UNITED STATES PATENT OFFICE 2,027,901

SUPPLEMENTARY TOOL SUPPORT FOR TURRET LATHES

Myron S. Curtis, Pawtucket, R. I., assignor to William Wallace Potter, Pawtucket, R. I.

Application June 29, 1932, Serial No. 620,039

1 Claim. (Cl. 29—57)

It is desirable in machine tools especially when the machine is equipped with a plurality of simultaneously or successively acting cutting or other tools, to provide a tool whose angle for its work or action may be changed or varied to suit the requirements of particular pieces of work. An object of my invention is to meet this requirement in machine tools and to utilize the movement of the main tool slide to actuate an auxiliary or supplemental tool slide that carries the tool whose path of travel during work may be at one or another angle. I have made my invention with especial reference to a machine tool of the multi-spindle station type, such for example as that forming the subject of application No. 542,156 filed in the names of William Wallace Potter and myself, and I show in the drawing and shall describe an embodiment of my invention in such a machine, but this is by way of exemplification and not restriction or limitation of my invention.

My invention consists in whatever is defined by or is included within the terms or scope of the appended claim.

In the drawing:

Fig. 1 is a top plan view of enough of a multi-spindle station machine tool to show that embodiment of my invention;

Fig. 2 is a side elevation thereof;

Fig. 3 is an end view;

Fig. 4 is a section on the line 4—4 of Fig. 2.

The machine in which my invention is illustrated as embodied is one having a main housing 10, in which is mounted a circular group of work spindles (not shown, but appearing fully illustrated in the aforesaid application) and having a main slide 11, upon which are mounted the various tools which by the reciprocation of the slide are brought into position for action on the work and moved thereover and retracted after the completion of such work.

Bolted to the chuck side of the main housing 10, is a bracket 12, that projects horizontally therefrom parallel with the spindles and the direction of reciprocating movement of the main slide 11. And upon such bracket, I mount the supplemental or auxiliary tool slide and parts concerned in the adjustment and movement thereof, and to provide adequate support for such bracket, it has a turned extension 13, which has a sliding bearing on the main tool slide 11, that may consist of a bushing 14, placed in an arm 15, fastened rigidly to the main tool slide 11, so that as the tool slide reciprocates, the arm bushing slides over the bracket extension 13.

On a plane face of the bracket 12, that is parallel with the direction of the reciprocation of the main tool slide 11, is rotatably secured a table 16, upon the outer side of which is mounted the auxiliary tool slide 17, that is reciprocable in a straight line on its slide connection with the table 16. The table 16 may be clamped in a rigid position to the bracket 12, by bolts 18, that engage concentric arcuate slots 19, in the table and when the bolts are relaxed, the table may be adjusted concentric with the center from which such slots are struck, so that the supplemental tool slide 17 may be placed to have its straight path of movement at the desired angle and there held by again tightening or clamping the bolts. For the convenient rotation of the table 16, for the desired angular adjustment, it has secured to it at its center of rotation a bushing 20, with a flange having peripheral rack teeth 21, with which mesh a pinion 22, on a stub shaft 23, with a squared outer end for the application of a turning wrench.

Concentric with the table bushing 20, is a shaft 24, which at one end has a pinion 25, that meshes with a rack bar 26, fixed to the auxiliary tool slide 17, so that by the rotation of the pinion, the tool slide may be moved in a straight line. Also on the shaft 24, is a pinion 27, with which meshes a rack 28, which slidably fits and extends through a hole in the bracket 12, that is parallel with the direction of reciprocation of the main slide 11, and extends beyond the bracket and parallel with the supporting extension 13, and through a guide hole 29, in the main slide arm 15. Upon opposite sides of the arm 15, a screw thread extension of the rack bar has adjustable nuts 30 and 31, respectively, which constitute stops that are spaced apart a greater distance than the distance between the opposite sides of the arm 15 so that when the arm 15 carried by the main slide 11, moves over the rack bar extension, no movement of the rack bar will take place until the moving arm 15 contacts with one stop or the other, according to the direction in which it moves, and following such contact, there will be movement of the rack bar along with the movement of the main slide 11, and thereby the shaft 24 revolved and through its pinion and rack connection with the auxiliary tool slide, the latter will be moved in a straight line, regardless of the angular direction of the path of movement.

For purposes of adjustment, the pinion 28, is secured to the shaft 24, by a clutch device that includes clutch teeth on the side of the pinion and a clutch collar 32, keyed to and slidable on the shaft which is moved out of clutching position by a coil spring 33, and into clutching position by a nut 34, that engages the outer face of the clutch collar and moves it against the spring pressure to place the clutch teeth in engagement.

What I claim is:

In a machine tool having a spindle supporting housing and a to and fro moving main slide, an auxiliary tool slide, a bracket projecting from the forward side of said housing and with which a surface on the housing has a thrust contact in the direction of movement of the main slide, means pivotally connecting the auxiliary tool slide to said bracket to change the direction of path of the auxiliary slide, means for holding it in adjusted position, means for imparting movement to the auxiliary slide from the main slide, comprising a rack and pinion, the rack being slidable in said bracket in the direction of movement of the main slide and a part carried by the main slide and acting upon said rack to move the rack, a shaft on which the pinion is mounted, a clutch between shaft and pinion releasable to permit turning of the pinion on the shaft for adjustment, and hand means to rotate the auxiliary slide to change its angle, comprising a gear on said shafts and a crank-operable pinion meshing with the gear.

MYRON S. CURTIS.